United States Patent [19]

Kim

[11] Patent Number: 5,587,741
[45] Date of Patent: Dec. 24, 1996

[54] APPARATUS AND METHOD FOR DETECTING MOTION VECTORS TO HALF-PIXEL ACCURACY

[75] Inventor: Sang-Ho Kim, Seoul, Rep. of Korea

[73] Assignee: Daewoo Electronics Co., Ltd., Seoul, Rep. of Korea

[21] Appl. No.: 278,663

[22] Filed: Jul. 21, 1994

[30]    Foreign Application Priority Data

Jul. 21, 1993 [KR] Rep. of Korea ............... 93-13836

[51] Int. Cl.$^6$ ........................... H04N 7/36
[52] U.S. Cl. ..................... 348/416; 348/699
[58] Field of Search ................. 348/699, 700, 348/416, 420, 407, 402

[56]          References Cited

U.S. PATENT DOCUMENTS

| | | |
|---|---|---|
| 4,937,666 | 6/1990 | Yang . |
| 5,408,269 | 5/1995 | Tsukagoshi ............... 348/416 |

FOREIGN PATENT DOCUMENTS

| | | |
|---|---|---|
| 0415491 | 3/1991 | European Pat. Off. . |
| 0468279 | 1/1992 | European Pat. Off. . |
| 0560577 | 9/1993 | European Pat. Off. . |
| 60-227583 | 11/1985 | Japan . |
| 02062178 | 3/1990 | Japan . |
| 2236449 | 4/1989 | United Kingdom . |

OTHER PUBLICATIONS

Staffan Ericsson, "Fixed and Adaptive Predictors for Hybrid Predictive/Transform Coding", IEEE Transactions on Communications, vol. COM-33, No. 12, Dec. 1985.

Ninomiya and Ohtsuka, "A Motion-Compensated Interframe Coding Scheme for Television Pictures", IEEE Transactions on Communications, vol. COM-33, No. 1, Jan. 1982.

Chen and Pratt, "Scene Adaptive Coder", IEEE Transactions on Communications, vol. COM-32, No. 3, Mar. 1984.

Jain et al., "Displacement Measurement and Its Application in Interframe Image Coding", IEEE Transactions of Communications, vol. COM-29, No. 12, Dec. 1981.

MPEG Video Simulation Model Three, International Organization for Standardization, Coded Representation of Picture and Audio Information, pp. D29–D32, 1990, ISO–IEC/JTC1/SC2/WG8 MPEG 90/041.

X. Lee, "A Fast Matching Algorithm of Motion Compensation for Hierarchical Video CODEC" Processing SPIE. Visual Communications and Image processing '92, vol. 1818, 18 Nov. 1992, pp. 1462–1474.

*Primary Examiner*—Tommy P. Chin
*Assistant Examiner*—A. Au
*Attorney, Agent, or Firm*—Anderson, Kill & Olick, P.C.

[57]          ABSTRACT

Motion vectors between a current frame and its preceding frame of video signals are optimally determined to a half-pixel accuracy by finding a plurality of full-pixel resolution motion vectors corresponding to a plurality of best matching blocks in a search region; and, thereafter, deriving a half-pixel resolution motion vector by selecting an half-pixel resolution block which yields the minimum error functions out of all possible half-pixel resolution candidate blocks included in half-pixel resolution search regions, each of which corresponding to one of the full-pixel motion vectors.

2 Claims, 5 Drawing Sheets

APPARATUS AND METHOD FOR DETECTING MOTION VECTORS TO HALF-PIXEL ACCURACY

FIELD OF THE INVENTION

The present invention relates to a method and an apparatus for encoding a video signal; and, more particularly, to a method and an apparatus for estimating a motion vector to a half-pixel accuracy.

DESCRIPTION OF THE PRIOR ART

As is well known, transmission of digitized video signals can attain video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data therethrough, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC(variable length coding). The motion compensated DPCM is a process of determining the movement of an object between a current frame and its previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12(December 1985); and in Ninomiya and Ohtsuka, "A Motion-Compensated Interframe Coding Scheme for Television Pictures", *IEEE Transactions on Communications*, COM-30, No. 1 (January 1982).

The two-dimensional DCT, which reduces or removes spatial redundancies between image data, converts a block of digital image data, for example, a block of 8×8 pixels, into a set of transform coefficient data. This technique is described in Chen and Pratt, "Scene Adaptive Coder", *IEEE Transactions on Communications*, COM-32, No. 3(March 1984). By processing such transform coefficient data with a quantizer, zigzag scanning, and VLC, the amount of data to be transmitted can be effectively compressed.

Specifically, in the motion compensated DPCM, current frame data is predicted from the corresponding previous frame data based on an estimation of the motion between the current and the previous frames. Such estimated motion may be described in terms of two dimensional motion vectors representing the displacement of pixels between the previous and the current frames.

Several methods for estimating the displacement of an object in a video sequence have been proposed. Generally, they can be classified into two types: pixel recursive algorithm; and block matching algorithm(see, e.g., J. R. Jain et al., "Displacement Measurement and Its Application in Interframe Image Coding", *IEEE Transactions of Communications COM*-29, No. 12(December 1981)). The present invention is primarily concerned with the block matching algorithm.

According to the block matching algorithm, a current frame is divided into a multiplicity of search blocks. The size of a search block typically ranges between 8×8 and 32×32 pixels. To determine a motion vector for a search block in the current frame, a similarity calculation is performed between the search block of the current frame and each of a plurality of equal-sized candidate blocks included in a generally larger search region within a previous frame. An error function such as the mean absolute error or mean square error is used to carry out the similarity measurement between the search block of the current frame and each of the candidate blocks in the search region. And a motion vector, by definition, represents the displacement between the search block and a candidate block which yields a minimum error function.

In a motion compensated coding method, the coding performance depends heavily on the accuracy of the motion vector. In the current available schemes such as ISO/IEC MPEG standards, a motion vector may be detected to a half-pixel accuracy (see MPEG Video Simulation Model Three, International Organization for Standardization, Coded Representation of Picture and Audio Information, 1990, ISO-IEC/JTC1/SC2/WG8 MPEG 90/041).

In a conventional half-pixel resolution motion estimator, motion estimation is performed in two steps. First, an integer-valued full-pixel resolution motion vector is derived for each search block in the current frame. Then, the full-pixel resolution motion vector is refined to a half-pixel accuracy, to thereby determine a final half-pixel resolution motion vector of a block. The half-pixel resolution motion vector may have a non-integer value and point to a location between full-pixel locations. The candidate blocks for estimation and compensation in the half-pixel resolution, i.e., half-pixel resolution candidate blocks, are spatially interpolated blocks of the previous frame and also included in a corresponding search region, which is called a half-pixel resolution search region (see, e.g., EP Pat. No. 0560577A2 issued to Lucas et al.). The search for the half-pixel resolution motion vector usually follows the full-pixel resolution motion estimation such that the half-pixel resolution motion vector is searched around a location indicated by the full-pixel resolution motion vector.

In case the half-pixel resolution candidate block which yields the minimum error function were not included in the half-pixel resolution search region resulting from the full-pixel resolution motion vector of the block, however the final half-pixel resolution motion vector which will be derived from the half-pixel resolution search region would not be optimal inasmuch as the other half-pixel resolution displacement would yield a smaller error function.

SUMMARY OF THE INVENTION

It is, therefore, a primary object of the present invention to provide a method for deciding an accurate half-pixel resolution motion vector of a block, which is not restricted to a half-pixel resolution search region defined by a full-pixel resolution motion vector of the block, thereby improving the overall compression efficiency.

In accordance with the present invention, there is provided a method for determining motion vectors between a current frame and its preceding frame of video signals to a half-pixel accuracy, wherein the current frame is divided into a multiplicity of search blocks of an identical size and the preceding frame is made to include a corresponding number of search regions, each of said search regions having a plurality of candidate blocks of said identical size, which comprises the steps of:

i) calculating error functions, each of said error functions representing the difference between a search block in the current frame and each of full-pixel resolution candidate blocks, i.e., each having an integer valued displacement, included in the corresponding search region of the previous frame;

ii) selecting a predetermined number of full-pixel resolution motion vectors for the search block which yield the predetermined number of smallest error functions, wherein said predetermined number is normally greater than one but smaller than the number of the candidate blocks in the search region corresponding to the search block;

iii) obtaining half-pixel resolution candidate blocks in a half-pixel resolution search region defined by one of the full-pixel resolution motion vectors;

iv) calculating and comparing error functions, each of said error functions representing the difference between the search block in the current frame and each of the half-pixel resolution candidate blocks, thereby selecting a half-pixel resolution block which yields a minimum error function; and v) repeating steps iii) and iv) for a next full-pixel resolution motion vector until all of the half-pixel resolution candidate blocks in the last half-pixel resolution search region corresponding to the last full-pixel resolution motion vector of the block are processed, to thereby yield the final half-pixel resolution motion vector of the block.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
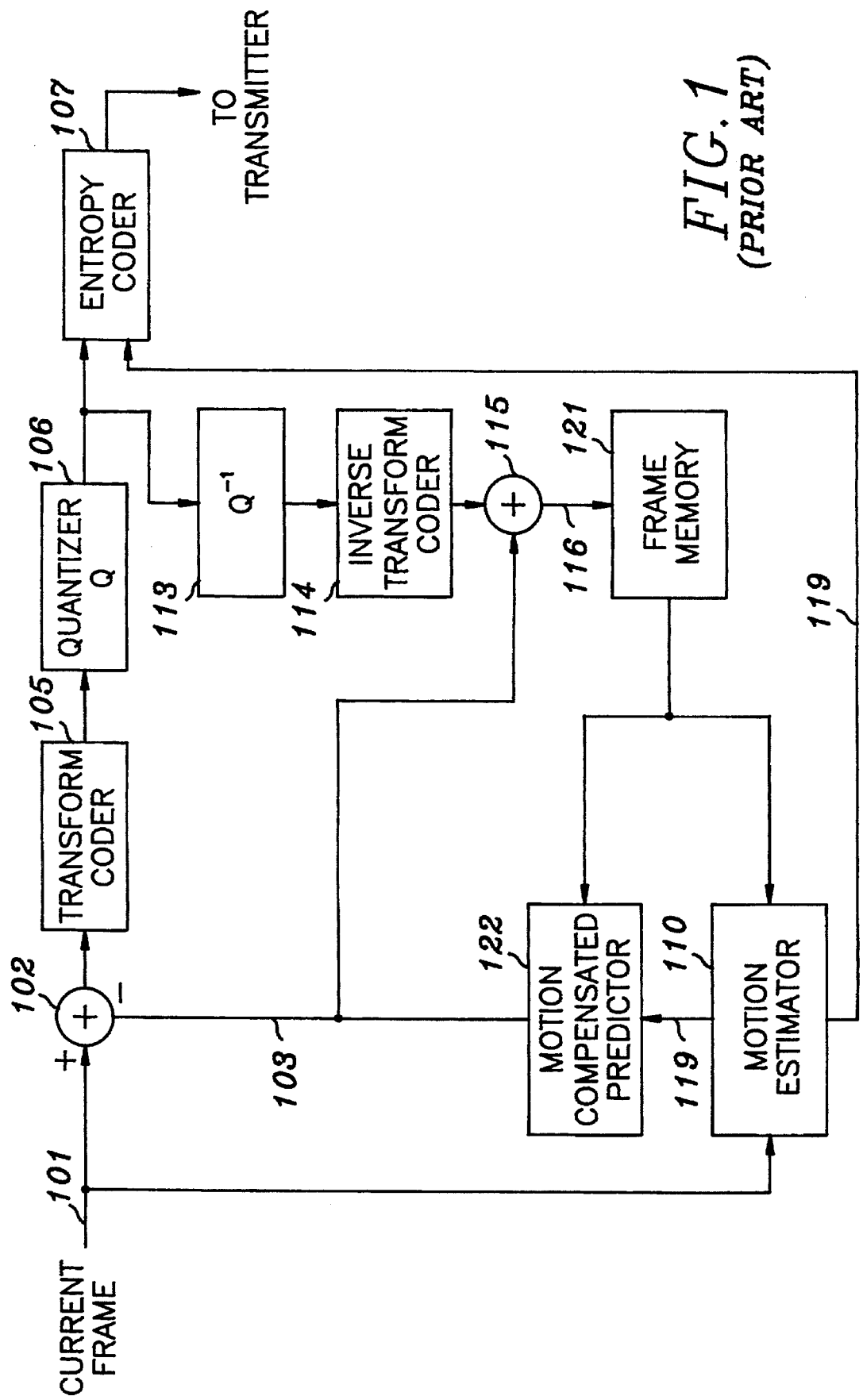
FIG. 1 is a block diagram of a prior art video encoder that employs the motion estimator of the present invention.

With reference to FIG. 1, there is shown a block diagram of a video encoder which employs a motion estimator 110 of the present invention. Current frame data 101 is fed to a subtracter 102 and the motion estimator 110. Actually, the current frame data is read, on a block-by-block basis, from an input memory(not shown) wherein each frame is stored as successive blocks of pixel data for the processing thereof on a block-by-block basis. The block size typically ranges between 8×8 and 32×32 pixels.

A block of predicted frame data 103 from a motion compensated predictor 122 is subtracted from the search block of the current frame data at the subtracter 102; and the resultant data, i.e., differential pixel data, is dispatched to a transform coder 105, wherein a block of differential pixel data is encoded into a set of transform coefficients by using, e.g., a discrete cosine transform. The transform coefficients are then quantized at a quantizer 106. Thereafter, the quantized transform coefficients are transmitted via two signal paths: one that leads toward an entropy coder 107, wherein the quantized transform coefficients are coded together with the motion vector 119 by using, for example, a combination of run-length and variable length coding; and the other that leads to an inverse quantizer 113 and then to an inverse transform coder 114, wherein the quantized transform coefficients are converted back into reconstructed differential pixel data by inverse quantization and inverse transformation, respectively. The reconstructed differential pixel data and predicted data from the motion compensated predictor 122 are combined at an adder 115 to provide reconstructed current frame data to be written onto a frame memory 121.

The current frame data 101 and the reconstructed previous frame data 118 from the frame memory 121 are processed to determine motion vectors by using the block-matching algorithm at the motion estimator 110 of the present invention, which will be described hereinafter with reference to FIGS. 2 to 5. The motion vector 119 is applied to the motion compensated predictor 122, wherein the predicted data, i.e., the candidate block data, corresponding to the motion vector 119 is retrieved from the frame memory 121 on a block-by-block basis and provided to the subtracter 102 and the adder 115 for further processing. And also the motion vector 119 is fed to the entropy coder 107.

In the motion estimator 110 of the present invention, a motion vector is determined in two steps with different resolution sizes as described hereinafter.

Figure 2:
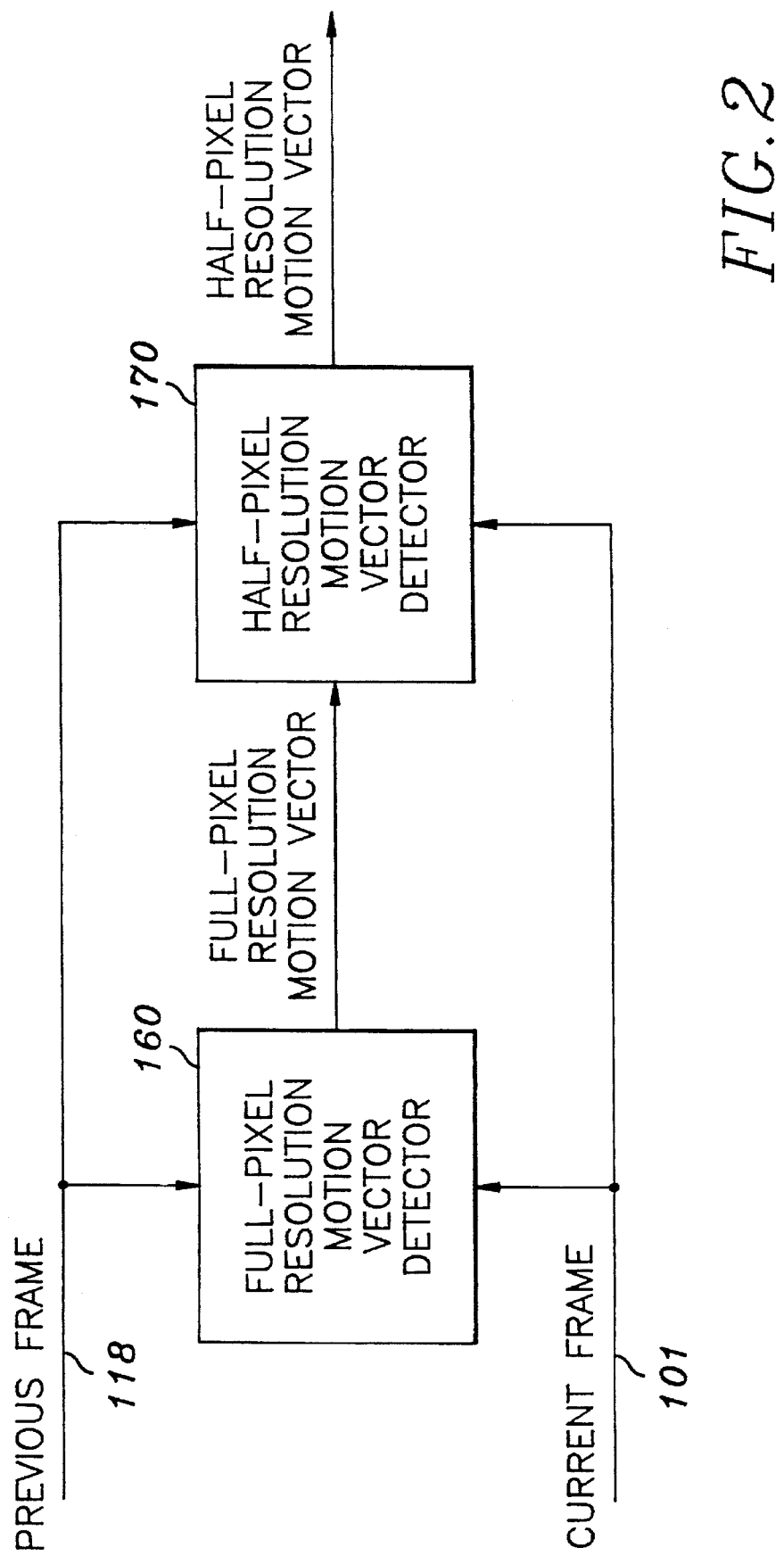
FIG. 2 shows a block diagram of the motion estimator of the present invention.

FIG. 2 illustrates a block diagram of the motion estimator 110 of the present invention shown in FIG. 1. The current frame data 101 and the reconstructed previous frame data 118 are applied to a full-pixel resolution motion vector detector 160 and to a half-pixel resolution motion vector detector 170. The full-pixel resolution motion vector detector 160 determines a plurality of full-pixel resolution motion vectors corresponding to the plurality of best matching blocks in a search region. These full-pixel resolution motion vectors are dispatched to a half-pixel resolution motion vector detector 170, wherein a half-pixel resolution motion vector is determined by selecting a half-pixel resolution block which yields a minimum error function out of all half-pixel resolution candidate blocks included in the plurality of half-pixel resolution search regions, each of which corresponding to one of the full-pixel motion vectors.

Figure 3:
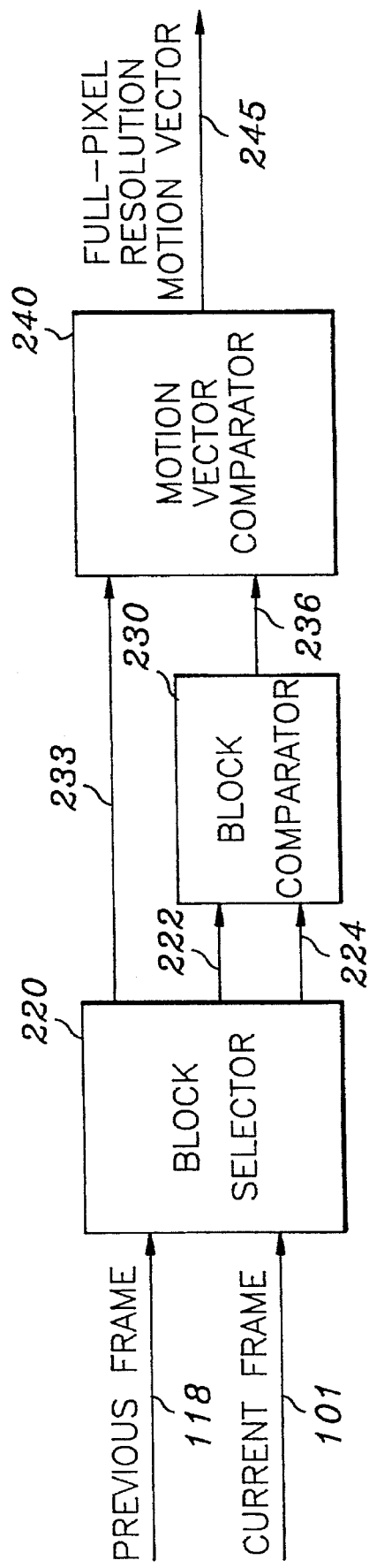
FIG. 3 schematically illustrates the full-pixel resolution motion vector detector shown in FIG. 2.

With reference to FIG. 3, there is shown a block diagram of the full-pixel resolution motion vector detector 160 shown in FIG. 2. Current frame data 101 and the previous frame data 118 are inputted to a block selector 220. At the block selector 220, a group of full-pixel resolution candidate blocks in a search region corresponding to a search block of the current frame are selected from the previous frame. These selected candidate blocks on line 222 and the search block on line 224 are inputted to a block comparator 230. The block comparator 230 calculates the error functions, each of the error functions representing the difference between the search block in the current frame and each of the candidate blocks with an integer valued displacement, included in the search region of the previous frame. These error functions on line 236 and corresponding displacements on line 233 from the block selector 220 are inputted to a motion vector comparator 240. The motion vector comparator 240 compares the error functions and selects a plurality of displacements which yield a plurality of smallest error functions in accordance with the procedure described in FIG. 4.

Figure 4:
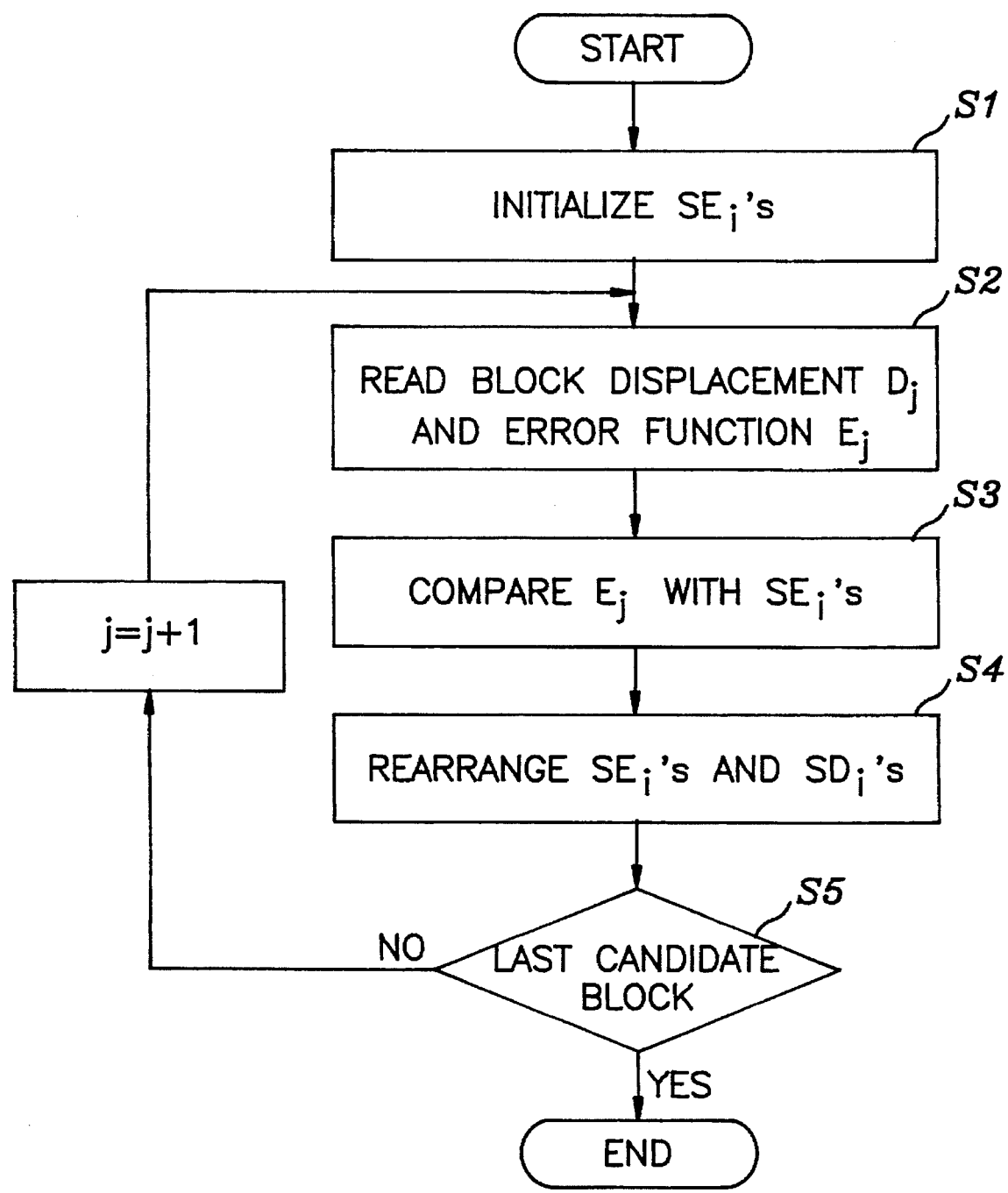
FIG. 4 represents a flow chart explaining the procedure carried out in the motion vector comparator of FIG. 3.

FIG. 4 shows a procedure to select a predetermined number, e.g., N, of full-pixel resolution motion vectors at the motion vector comparator 240. $SE_i$'s and $SD_i$'s are two groups of variables to store N selected error functions and corresponding displacements respectively, wherein i is a positive integer value ranging from 1 to N. In step S1, $SE_i$'s are initialized to a value larger than the maximum error function value. The initial value of j is 1. Therefore, in step S2, an error function $E_1$ and a displacement $D_1$ of a first candidate block are read from the block selector 220 and the block comparator 230 shown in FIG. 3. Then, $E_1$ is compared with all the $SE_i$ values in step S3. In step S4, if one of $SE_i$ values is larger than $E_1$, the largest $SE_i$ value is discarded and the remaining $SE_i$ values and $E_1$ are rearranged, e.g., in an ascending order with the smaller value of in being related to the smaller error function value, and stored back in $SE_i$'s for the processing of a next candidate block. If all $SE_i$ values are smaller than $E_1$, $SE_i$'s remain the same. Displacements are also stored in $SD_i$'s in accordance with the rearranged $SE_i$'s in step S4. Actually, all $SE_i$ values are initialized to an identical value and are larger than $E_1$. In case that multiple $SE_i$'s have the same largest value and the value is larger than $E_1$, the value in any the $SE_i$'s is discarded and replaced by $E_1$. Steps S2 through S4 are repeated for the next candidate block, i.e., second candidate block in the search region. Specifically, in step S2, an error function $E_2$ and a displacement $D_2$ of a second candidate block are read. Then, $E_2$ is compared with all the $SE_i$ values in step S3. In step S4, if one of $SE_i$ values is larger than $E_2$, the largest $SE_i$ value is discarded and the remaining $SE_i$ values and $E_2$ are rearranged and stored back in $SE_i$'s for the processing of a next candidate block. Displacements are also stored in $SD_i$'s in accordance with the rearranged $SE_i$'s in step S4. Steps S2 through S4 are repeated for the remaining candidate blocks until all the candidate blocks in the search region are processed. After all the candidate blocks have been processed, i.e., j equals the number of candidate blocks in the search region, the displacements remaining in $SD_i$'s are determined as the full-pixel resolution motion vectors with respect to the search block.

Figure 5:
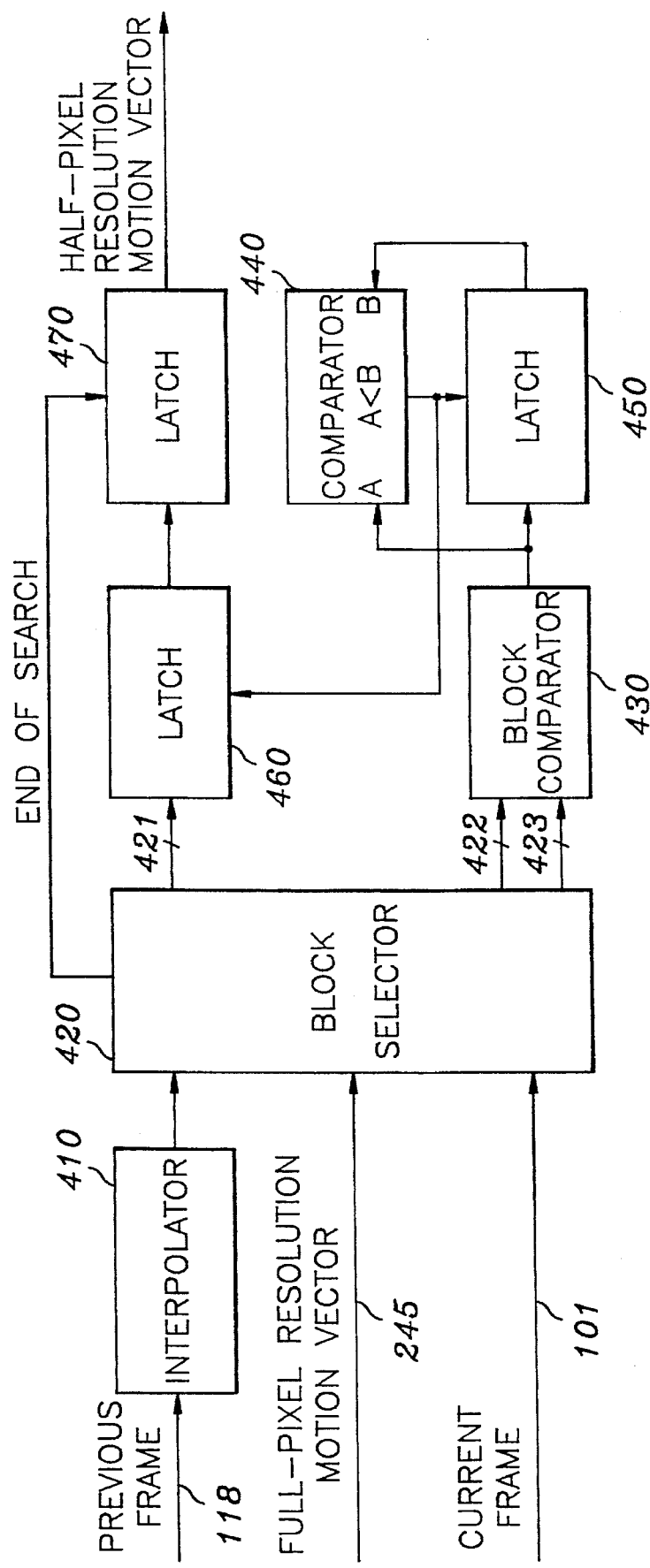
FIG. 5 depicts a block diagram of the half-pixel resolution motion vector detector of FIG. 2.

FIG. 5 is a block diagram of the half-pixel motion vector detector 170 shown in FIG. 2. Interpolated frame data, i.e., the previous frame data in a half-pixel position, are calculated at a frame interpolator 410. A block selector 420 receives the interpolated frame data and the current frame data 101 together with the full-pixel resolution motion vectors 245 from the motion vector comparator 240 shown in FIG. 3. At the block selector 420, half-pixel resolution candidate blocks in a half-pixel resolution search region corresponding to one of the full-pixel resolution motion vectors are selected from the interpolated frame. An end-of-search signal is also produced at the block selector 420 upon the completion of processing each search block. One of the half-pixel resolution candidate blocks on line 422 and the search block of the current frame on line 423 are dispatched to a block comparator 430, to thereby calculate an error function between the two blocks therein. The corresponding half-pixel resolution displacement between the two blocks on line 421 is fed to a latch 460. The error function A is dispatched to a comparator 440 and to a latch 450. At the start of each search block processing, B in the comparator 440 is initialized to a certain large value, to be replaced with error functions as explained hereinafter. The comparator 440 compares the error function A with the stored value B. If A<B, then the comparator outputs a pulse to the latch 450 which latches or stores the error function A in place of B, thereby replacing the previously stored value with the new error function. In this case, the displacement of the half-pixel resolution block is also latched by the latch 460. If A≧B, the value B remains unchanged, and the displacement in latch 460 remains the same. After the block selector 420 outputs all the half-pixel resolution candidate blocks associated with the full-pixel resolution motion vector, the process of calculating and comparing error functions are repeated for a next search region indicated by a next full-pixel resolution motion vector. After all the half-pixel resolution search regions corresponding to each of the full-pixel resolution motion vectors have been processed, the half-pixel resolution displacement which yields the minimum error function in all the search regions corresponding to each of the full-pixel resolution motion vectors remains in the latch 460. And the end-of-search signal, produced at the block selector 420, latches the displacement at the latch 460 into the latch 470, wherein the value on the output lead represents the final half-pixel resolution motion vector associated with the search block of the current frame. In accordance with this method, the half-pixel resolution motion estimation is performed for a plurality of search regions corresponding to each of the full-pixel resolution motion vectors, providing a more correct half-pixel resolution motion vector.

Although the present invention has been described with respect to a half-pixel resolution motion vector, motion vectors, which are calculated in terms of various sub-pixel resolutions, e.g., a ¼ pixel resolution, can be used in encoding a motion picture, and such motion vectors can be calculated in a similar manner as presented herein.

Accordingly, while the present invention has been described with respect to the particular embodiments, it will be apparent to those skilled in the art that various changes and modifications may be made without departing from the spirit and scope of the invention as defined in the following claims.

What is claimed is:

1. A method for determining motion vectors between a current frame and a preceding frame of video signals to a half-pixel accuracy, wherein the current frame is divided into a multiplicity of search blocks of an identical size and the preceding frame is made to include a corresponding number of search regions, each of the search regions having M candidate blocks of said identical size, M being an integer greater than 1, which comprises the steps of:

(a) calculating M first error functions, each of the M first error functions representing the difference between a search block in the current frame and each full-pixel resolution candidate block, included in the corresponding search region of the preceding frame;

(b) selecting K full-pixel resolution motion vectors for the search block which yield smallest first error functions among said M first error functions, K being an integer greater than 1 and smaller than M;

(c) obtaining M half-pixel resolution candidate blocks, in a half-pixel resolution search region corresponding to one of the K full-pixel resolution motion vectors;

(d) calculating M second error functions, each of the M second error functions representing the difference between the search block in the current frame and each of said M half-pixel resolution candidate blocks;

(e) repeating steps (c) to (d) for the remaining (K−1) full-pixel resolution motion vectors obtained in step (b), providing K×M second error functions;

(f) selecting a half-pixel resolution motion vector for the search block, said half-pixel resolution motion vector yielding a second error function which is smallest among the K×M second error functions; and (g) repeating steps (a) to (f) until all the search blocks in the current frame are processed.

2. The method in accordance with claim 1, wherein said step (b) includes the steps of:

(b1) initializing a first group of variables, $SE_i$'s, which stores K first error functions, wherein i is a positive integer ranging from 1 to K;

(b2) reading a first error function E and a displacement D corresponding to a candidate block in a search region of the previous frame;

(b3) comparing said E with the values stored in said $SE_i$'s;

(b4) arranging the values stored in said $SE_i$'s and said E in an ascending order and storing K values in said $SE_i$'s except the largest one;

(b5) storing displacements, each of said displacements corresponding to one of the values stored in $SE_i$'s, in a second group of variables, $SD_i$'s, wherein i is the positive integer ranging from 1 to K; and (b6) repeating steps (b1) to (b5) until all of the candidate blocks in the search region are processed.

* * * * *